United States Patent [19]

Granier et al.

[11] Patent Number: 4,690,063
[45] Date of Patent: Sep. 1, 1987

[54] ULTRARAPID GAS GENERATOR WITH INCREASED SAFETY

[75] Inventors: Georges Granier, Viry Chatillon; Yves Valliere, Le Beuzit, both of France

[73] Assignee: Societe Nationale des Poudres et Explosifs, Paris, France

[21] Appl. No.: 770,504

[22] Filed: Aug. 28, 1985

[30] Foreign Application Priority Data

Sep. 5, 1984 [FR] France .................................. 84 13635

[51] Int. Cl.⁴ ............................. F42B 5/20; F42B 9/18
[52] U.S. Cl. ..................................... 102/530; 102/202; 102/202.5; 102/202.7; 280/741
[58] Field of Search ................ 102/202, 202.5, 202.7, 102/202.14, 530, 531; 280/741

[56] References Cited

U.S. PATENT DOCUMENTS

| | | | |
|---|---|---|---|
| 2,506,157 | 5/1950 | Loret | 102/202.14 |
| 3,051,086 | 8/1962 | La Costa et al. | 102/530 |
| 4,220,088 | 9/1980 | Kimura et al. | 102/202.7 |

FOREIGN PATENT DOCUMENTS

| | | |
|---|---|---|
| 2239870 | 2/1975 | France . |
| 2295360 | 7/1976 | France . |
| 2491647 | 4/1982 | France . |
| 2073859 | 10/1981 | United Kingdom . |

Primary Examiner—Harold J. Tudor
Attorney, Agent, or Firm—Bucknam and Archer

[57] ABSTRACT

Pyrotechnic gas generator utilizable particularly on a motor vehicle for operating safety devices, such as safety belt retractors.

The generator comprises a resistant body containing an ignition bead (5) and a gas generating charge (3). In order to obtain very short operating times while offering maximum safety and reliability, the gas generating charge is separated from the ignition bead by a dielectric hood (6) which forms a leak-tight initiation chamber (7) around the ignition bead, the gas generating charge being composed of grains of powder based on nitrocellulose and a pulverulent oxyreduction powder containing at least one metal.

15 Claims, 1 Drawing Figure

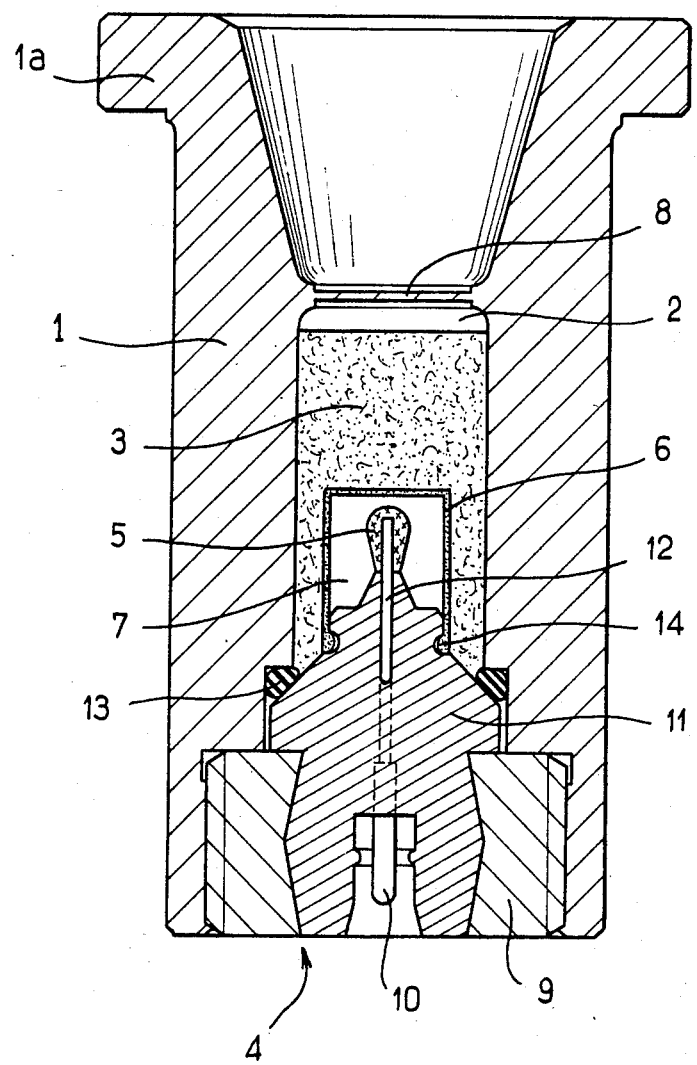

ULTRARAPID GAS GENERATOR WITH INCREASED SAFETY

The invention relates to a pyrotechnic gas generator which is utilizable in particular in a motor vehicle for operating safety devices, such as safety belt retractors which are triggered in the event of a collision detected by a calibrated accelerometer. Pyrotechnic generators of this kind comprise on one hand a mechanically resistant body forming a combustion chamber which is provided with a closure means and which contains a gas generating charge, and on the other hand an initiation plug which comprises an ignition bead fired by means of a resistant filament and which is fixed on the body and penetrates into the combustion chamber.

Ultrarapid gas generators are known, and many types of these generators have been described and used, particularly in the field of motor vehicle safety, whether these small generators form an independent unit or are directly integrated into the structure of a safety belt tensioning jack or a belt winder and retractor. For example, patent FR No. 2 491 647 describes in particular a pyrotechnic jack which pulls a cable fastened to an external cylinder coupled to the winding drum of a safety belt, and FIGS. 4 and 5 of this patent show ultrarapid gas generators which are called "combustible charge cartridges". Cartridges of this kind correspond to one of the conventional constructions of generators and comprise on one hand a resistant body forming a combustion chamber which is provided with a closure means and contains a gas generating charge, and on the other hand an initiation plug which is called a "detonator" and which is illustrated as an ignition bead fired by means of a resistant filament, this plug being fixed on the body and penetrating into the combustion chamber. In this patent only the general known construction of ultrarapid generators is described, and no details are given of the nature of the combustible charge or the characteristics of these generators; this is normal inasmuch as, on one hand, this patent claims a "cylinder and piston type drive control for return tensioner systems for automatic safety belt winders", and, on the other hand, combustible charges and the characteristics of generators of this kind had already been described previously, in particular in patents FR No. 2 295 360 and FR No. 2 239 870.

The patent FR No. 2 295 360 describes a gas generator ignition device adapted to be installed in a safety belt type retaining system in motor vehicles. The ignition head shown in FIG. 2 corresponds to another conventional construction, for which the resistant firing filament is directly in contact with a highly sensitive pulverulent composition, and this charge is contained in a metal casing crimped on an insulating base, this metal casing being intended to provide protection for the soldered filament against vibration and also to effect the electrical shielding of this filament.

Patent FR No. 2 239 870 describes in particular a gas generating charge which is composed of grains of homogeneous powder based on nitrocellulose and nitroglycerine, and of a pulverulent ignition powder based on copper oxide and zirconium, this charge being intended for the propulsion of a piston of a safety belt tensioning jack.

According to these three prior patents, which belong to three different companies, and in accordance with knowledge of pyrotechnics, when it is necessary to obtain very short operating times, the ignition powder is placed in direct contact with the resistant firing filament, which is bare when the powder is highly sensitive and is similar to primary explosives, or which is surrounded by an ignition bead of primary explosive when the ignition powder is a live but insufficiently sensitive powder. It is known that only this arrangement can ensure operating times less than 2 or 3 milliseconds, such as are demanded by the standards and rules drawn up by those responsible for motor vehicle safety and by motor vehicle manufacturers since 1970-1972. On the other hand, an arrangement of this kind has the disadvantage that either it uses a mass of highly sensitive powder which is far from being a negligible amount when the ignition powder is placed in direct contact with a bare filament, with all the risks entailed in the event of an abnormal rise in temperature or in the event of improper recovery of these explosives which have been put on the market. It may also expose the ignition bead of the primary explosive to friction against the ignition composition, thus entailing not only a risk which, although slight must nevertheless be taken into account in reliability calculations, namely the risk of accidental firing, but also the much greater risk that the ignition bead may be eroded and worn by friction against the ignition composition, since these generators are essentially intended for installation in motor vehicles, and are thus liable to undergo for many years the vibration and tremors due to the running of these vehicles. Moreover, generators of this kind must have electrical protection to ensure that accidental firing does not occur even under the most risky conditions.

One object of the present invention is to keep the operating times of gas generators within the limits imposed, while increasing safety through the elimination of the main causes of accidental operation or failure to operate, and at the same time also improving safety in the manufacture of these generators.

The invention resides in the fact that the initiation plug comprises a hood forming a leaktight initiation chamber around the ignition bead, and the gas generating charge, which is composed of grains of powder based on nitrocellulose and of a pulverulent oxidoreduction powder containing at least one metal, is disposed entirely outside the dielectric hood, while the material of the hood does not impair the stability of the grains of powder based on nitrocellulose.

It has in fact been discovered that, provided a particular ignition charge is used under particular conditions, it is possible to eliminate contact between the ignition powder and the ignition bead without lengthening the operating time by more than 0.1 or 0.2 millisecond, even when the ignition powder is not a high sensitivity powder. It has also been discovered that not only is it possible not to place the ignition bead in contact with the ignition powder, but it is also possible to place a hood around the ignition bead. This hood has a sufficient thickness to ensure that its dielectric strength will avoid all sparking between the firing filament and the body of the generator, this being achieved without increasing the operating time by more than 0.3 or 0.4 millisecond. The electrical protection is further increased in cases where an ignition powder containing a metal may form a slight conductive deposit outside the hood, which must be sufficiently leaktight so that the ignition powder cannot in any circumstances penetrate into the initiation chamber which surrounds the ignition bead and which must remain free, with no powder contained inside the hood. In addition to the particular conditions of leaktightness and non-impairment of the stability of the grains of powder based on nitrocellulose due to the material of the hood, the preponderant part played by the commencement of combustion of the gas generating charge has been discovered; the closure means of the combustion chamber must in fact open only under a pressure higher than 100 bars, although a pressure of 50 bars may be admissible in special cases where the operating time is raised to more than 3 milliseconds; nevertheless, this opening pressure should whenever possible be raised to at least 300 bars in order to shorten the operating time and reduce the dispersion of the pressure values depending on the times determined experimentally.

In one particular embodiment the dielectric hood is made of compact material, despite the great mechanical resistance that this entails at the moment of the rupture following the firing of the ignition bead, but closed-pore cellular materials are permissible. More particularly, the material of the hood is selected from the group consisting of the polyethylenes and polypropylenes, and this preferential condition becomes imperative when the grains of powder based on nitrocellulose contain diphenylamine as stabilizer, because it has been discovered that, under the particular conditions specific to the motor vehicle industry, it is not possible to use ethylene-vinyl acetate resins and polyamides, particularly polyamides 11, although these are plastics materials normally used in the field of pyrotechnics. The case of ethylene-vinyl acetates is particularly surprising, because it is sufficient to keep at 105° C. for two days a mixture of this resin and nitrocellulose based powder, in which the stabilizer is diphenylamine and the plasticizer is a mixture of dinitrotoluene and dibutyl phthalate, to observe a consequent degasification which proves the instability of these powder grains in the presence of this plastics material. A material such as "RILSAN", which is a polyamide 11, has better characteristics which would make it usable provided either the outer suface of the hood is metallized or the hood is covered externally by a fine metal jacket. This would provide the advantage of avoiding any localization of the electrostatic charges but would complicate manufacture and reduce the reliability of the generator in the case of metallization, which could be eroded by friction. This complication is unnecessary because it has been discovered that when a pulverulent ignition powder containing at least one metal of very small particle size is used, a slight deposit is formed on the outer surface of the hood and is sufficiently conductive to avoid localization of electrostatic charges, and thus to limit still further the risk of formation of a spark through this hood. This fact explains the particular interest of using an ignition powder which is conductive, on the scale of the leakage currents, when the material of the hood is exclusively a dielectric material.

More particularly, the thickness of the hood of dielectric material is between 0.2 and 0.5 mm, this thickness being compatible with the introduction of a slight operating delay, making it possible to obtain good electrical protection of the igniter consisting of the filament and the ignition bead, especially when the material used is high-density polyethylene, which has a very satisfactory dielectric strength.

It is advantaeous to fix the dielectric hood to the initiation plug by means of a bead fitting into a circular groove, and to provide the inner end of this initiation plug with a cone clamping an O-ring seal wedged against the bottom and the cylindrical surface of a counterbore extending the combustion chamber.

In a preferred embodiment the grains of powder based on nitrocellulose have a thickness to be burned ranging from 0.1 to 0.6 millimeter, more particularly between 0.15 mm, in order to have sufficient mechanical resistance, and 0.4 mm in order to maintain an adequate filling coefficient despite the loose arrangement of the powder grains in the combustion chamber. Nitrocellulose based powders, which are therefore free from explosive oils such as nitroglycerine, make it possible to obtain the highest safety, particularly in the case of non-porous compact monotubular Vieille powders containing on one hand diphenylamine as stablizer and on the other hand a mixture of dinitrotoluene and dibutyl phthalate as plasticizer.

In another preferred embodiment the oxidoreduction powder contains at least 30% of metal, more particularly zirconium, intimately mixed with barium chromate and ammonium perchlorate.

The weight ratio between the oxidoreduction powder and the nitrocellulose based powder is advantageously between 0.05 and 1, this ratio not exceeding 0.5 when the oxidoreduction powder is based on zirconium, barium chromate, ammonium perchlorate and ammonium bichromate, and not falling below 0.1 in cases where the closure means would rupture at a pressure lower than 300 bars.

The volume of the gas generating charge is preferably smaller than the volume of the combustion chamber delimited between the closure means, the resistant body, and the initiation plug with its hood, so that in the course of manufacture the bottom of the hood will not touch the free surface of the gas generating charge when the plug is placed in position on the body. This permits to work under the highest safety conditions. Moreover, during very numerous tests carried out it has been found that not only did this volume of entrapped air has no substantial effect on operating times, but in addition it contributes towards reducing the dispersion of pressure values plotted experimentally against time, and that it does not in any way impair the maintenance of a slightly conductive deposit of the oxidoreduction powder on the outer surface of the hood. The body of the generator is itself made of a material permitting the circulation of electric charges, this material being metallic or composed of plastics materials containing conductive particles, such as bronze microballs.

The advantages obtained from this invention consist essentially of the operating reliability of the generator which is substantially improved. This improvement is more important because the number of years during which it will be installed in a motor vehicle is itself great; the risk of deterioration of the ignition bead is practically nonexistent and is due only to the igniter itself and not to the gas generator according to the invention. The maximum reliability is particularly important for devices intended to save human lives, such as safety belts, and this improvement of reliability is accompanied by increased safety resulting on one hand from the elimination of the risk of accidental triggering through friction on the ignition bead or through electrostatic discharge, and on the other hand from the elimination of risks associated with the utilization of high-sensitivity ignition compositions capable of detonating, as well as from the limitation of risks connected with an abnormal rise of temperature.

The invention is explained in greater detail below with the aid of a drawing, in which the single FIGURE shows one particular form of construction which is the preferred embodiment.

The ultrarapid gas generator is shown substantially to the scale of 3, and the resistant body (1) which has a fastening flange (1a), is made of machining duraluminium to enable the closure means (8) to be machined in the mass, the base (9) of the initiation plug (4) being made of the same material. The closure means has a thickness of 0.6 mm, which corresponds to a theoretical shearing pressure of a little over 500 bars in the combustion chamber (2), this shearing occurring from 1.2 to 1.4 milliseconds after the application of the firing electric pulse to the terminals (10) of the initiator (11). This initiator is made of insulating material which is moulded inside the base (9) and which encloses the two pins (12) connected to the external terminals (10) and connected together by the resistant filament, the ignition bead (5) covering the free ends of these pins and the filament. Igniters of this kind are available in commerce, and for example the company NCS (Nouvelles Cartoucheries de Survilliers) offers igniters in which the ignition bead is based on potassium chlorate, lead thiocyanate, and zirconium hydride, and which give complete satisfaction for the application of the present invention. The inner end of the initiator (11) comprises first a cone for clamping an O-ring seal (13) which is wedged against the bottom and the cylindrical surface of a counterbore provided outside the combustion chamber. This end then has a peripheral groove formed at the base of a cylindrical shoulder permitting adequate support of the dielectric hood (6), the internal bead (14) at the opening of which fits sealingly over the peripheral grove.

This hood has a thickness of 0.25 mm, and it is made of injection moulded high-density polyethylene. A hood of this kind permits, for example, the discharge of a capacitor of 550 pF at 25 kv with a series resistor of 5 kiloohms connected between one of the terminals (10) and the body (1), which corresponds to a discharge energy of 156 mj which will not effect the firing of the igniter. The volume of the initiation chamber (7) has very little influence on the operating time, and the most important characteristic corresponds to the minimum distance existing between one of the conductor elements inside the ignition bead (5) and the inner surface of the hood, since this free distance contributes towards increasing the safety insulation and thus sup Lementing the insulation provided by the dielectric hood (6). The nitrocellulose based powder used is a Vieille powder of the BTU type which is marketed by SNPE (Societe Nationale des Poudres et Explosifs), in which the stabilizer is diphenylamine and the plasticizer is a mixture of dinitrotoluene and dibutyl phthalate. The grains of powder are monotubular, their outside diameter being 1 mm their inside diameter 0.2 mm, which corresponds to a thickness to be burned of a value of 0.2 mm, since the thickness to be burned is equal to half the wall thickness. The pulverulent oxidoreduction powder used as ignition powder is preferably MIRA powder, which is marketed by SNPE, this powder having in particular low sensitivity to confinement, which makes any detonation impossible under the conditions of use, even abnormal conditions, This is not the case with very many ignition powders or black powders, which could detonate under certain conditions. The combination of these two types of powder is particularly important, the oxidoreduction powder ensuring a very rapid rise of temperature and the Vieille powder having a better gas yield and permitting a slight spread in time of the generation of gas after the rupture of the closure means, since the total combustion time of the grains of Vieille powder is from 3 to 5 milliseconds depending on the amount of ignition powder used and the thickness of the closure means. Of the different tests carried out, those which were carried out with MIRA powder used masses of powder ranging from 0.17 to 0.34 gram, combined respectively with masses of BTU powder between 0.9 and 0.6 gram. All the tests result in operating times shorter than 2.2 milliseconds, and amounts of MIRA powder limited to 0.05 or 0.06 gram still lead to acceptable results for tests at 20° C., although they give operating times which are too long for tests at low temperatures.

Other embodiments of the invention are possible, particularly in respect of the choice of the ignition powder, which must be a non-detonating powder containing a metal, since powders which are completely insulating in respect of electricity do not enable such short operating times to be obtained, while zirconium powders permit better distribution of electric charges on the outside surface of the hood (6) than aluminum powders. Different types of hood can also be used, particularly a hood of semirigid closed-pore foam which slides in contact with the side surface of the combustion chamber and fits around the ignition bead, the initiation chamber (7) then being extremely small but enabling the gas generating charge (3) to occupy the entire free volume of the combustion chamber, while electrical insulation is then provided by air-filled cavities and the films of polymer used to form the foam. An expanded material of this kind makes it possible to reduce the mechanical resistance of the hood while enabling good insulation to be maintained; other means of reducing the resistance of the bottom of the hood, such as weakening grooves, can be used, particularly when the thickness of the hood is greater. In the same way, weakening grooves can be formed on the closure means (8) in order to avoid the abrupt shearing of this closure means at high pressure, radial grooves permitting opening by raising sectors of the closure means—which eliminates any projection of metal but brings about a slight increase of the operating time.

We claim:

1. An ultrarapid gas generator, utilizable in particular on a motor vehicle, which comprises a mechanically resistant body (1) forming a combustion chamber (2), a closure means (8) for the combustion chamber, a gas generating charge (3) within the combustion chamber, an initiation plug (4) which comprises an ignition bead (5) fired by means of a resistant filament and which is fixed on the body (1) and penetrates into the combustion chamber, wherein the initiation plug (4) has a hood (6) forming a leaktight initiation chamber (7) around said ignition bead (5), whereby said ignition bead is separated from the gas generating charge (3), the gas generating charge is composed of grains of powder based on nitrocellulose and of a pulverulent oxidoreduction powder containing at least one metal and said gas charge, is disposed entirely outside the hood.

2. The gas generator according to claim 1, wherein the closure means (8) of the combustion chamber opens only under a pressure higher than 100 bars.

3. The gas generator according to claim 1, wherein the hood (6) is made solely of dielectric material.

4. The gas generator according to claim 3 wherein said dielectric material is a compact dielectric material.

5. The gas generator according to claim 1, wherein the material of the hood is a member selected from the group consisting of polyethylenes and polypropylenes.

6. The gas generator according to claim 3, wherein the thickness of the hood is between 0.2 and 0.5 mm.

7. The gas generator according to claim 1, wherein the initiation plug (4) has in inner end (11) comprising a cone.

8. The gas generator according to claim 1, wherein the grains of nitrocellulose based powder have a thickness to be burned between 0.1 and 0.6 millimeters.

9. The gas generator according to claim 1, wherein said nitrocellulose based powder contains diphenylamine as stablizer and a mixture of dinitrotoluene and dibutyl phthalate, as plasticizer.

10. The gas generator according to claim 1, wherein the grains of nitrocellullose based powder are monotubular and consist of compact powder.

11. The gas generator according to claim 1, wherein the oxidoreduction powder contains at least 30% of metal.

12. The gas generator according to claim 11, wherein the oxidoreduction powder contains zirconium.

13. The gas generator according to claim 11, wherein the oxidoreduction powder consists essentially of zirconium, barium chromate and ammonium perchlorate.

14. The gas generator according to claim 1, wherein the weight ratio between the oxidoreduction powder and the nitrocellulose based powder is between 0.05 and 1.

15. The gas generator according to claim 1, wherein the volume of the gas generating charge (3) is smaller than the volume of the combustion chamber (2).

* * * * *